US009527216B2

(12) United States Patent
Lee et al.

(10) Patent No.: US 9,527,216 B2
(45) Date of Patent: Dec. 27, 2016

(54) WRIST STRUCTURE FOR AN ARTICULATED ROBOTIC ARM

(71) Applicant: HIWIN TECHNOLOGIES CORP., Taichung (TW)

(72) Inventors: Yu-Shan Lee, Taichung (TW); Shu-Hung Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 309 days.

(21) Appl. No.: 14/522,203

(22) Filed: Oct. 23, 2014

(65) Prior Publication Data

US 2016/0114491 A1  Apr. 28, 2016

(51) Int. Cl.
*B25J 19/00* (2006.01)

(52) U.S. Cl.
CPC ........... *B25J 19/0029* (2013.01); *Y10S 901/23* (2013.01); *Y10S 901/29* (2013.01)

(58) Field of Classification Search
CPC ...... B25J 19/0029; B25J 19/0025; B25J 19/00
See application file for complete search history.

(56) References Cited

U.S. PATENT DOCUMENTS

| | | | | |
|---|---|---|---|---|
| 5,829,307 A * | 11/1998 | Harima | ................ | B25J 19/0029 414/918 |
| 6,275,748 B1 * | 8/2001 | Bacchi | .............. | H01L 21/68707 414/941 |
| 2004/0103740 A1 * | 6/2004 | Townsend | .............. | B25J 9/1612 74/490.01 |
| 2011/0154938 A1 | 6/2011 | Liu et al. | | |
| 2012/0210817 A1 * | 8/2012 | Kassow | ............... | B25J 19/0004 74/490.03 |
| 2014/0309776 A1 * | 10/2014 | Asada | .................... | B25J 9/1651 700/258 |
| 2014/0309777 A1 * | 10/2014 | Niu | ........................... | B25J 9/06 700/258 |
| 2014/0309778 A1 * | 10/2014 | Asada | ........................ | B25J 9/06 700/258 |
| 2015/0108099 A1 * | 4/2015 | Ferrero | ................ | B23K 11/314 219/86.33 |
| 2016/0114491 A1 * | 4/2016 | Lee | ...................... | B25J 19/0029 74/490.06 |

FOREIGN PATENT DOCUMENTS

JP        2006321026 A       11/2006

* cited by examiner

*Primary Examiner* — David M Fenstermacher
(74) *Attorney, Agent, or Firm* — Wang Law Firm, Inc.

(57) ABSTRACT

A wrist structure for an articulated robotic arm includes: a wrist body, a rotary member, a signal processing circuit board, a connector, a control unit and a drive unit. The wrist body includes a front end portion, a rear end portion, a receiving portion, and a wiring hole formed in the rear end portion. The rotary member is rotatably connected to the front end portion. The signal processing circuit board is removably disposed at the rear end portion, located inside the receiving portion and includes a gap aligned with the wiring hole. The connector is disposed in the wrist body and signal connected to the signal processing circuit board. The control unit is disposed inside the receiving portion and signal connected to the signal processing circuit board. The drive unit is disposed in the receiving portion to control the rotary member to swing with respect to the wrist body.

8 Claims, 9 Drawing Sheets

WRIST STRUCTURE FOR AN ARTICULATED ROBOTIC ARM

BACKGROUND OF THE INVENTION

Field of the Invention

The present invention relates to an articulated robotic arm, and more particularly to a wrist structure for an articulated robotic arm.

Description of the Prior Art

Robotic arms have found wide application in various equipments due to their versatility and superior operability. For example, the robotic arm used in machining industry can pick up and move objects to a processing machine to enable the objects to be processed by the processing machine in an automatic manner. The robotic arm can also be applied in medical field and controlled by a doctor to perform operation on patients. For a further example, the robotic arm can be used in game play to grab objects.

Referring to FIG. 1, which shows a robotic arm assembly disclosed in U.S. Publication No. 20110154938A1, in order to control the rotation of the motor inside the wrist joint 13, a plurality of cables are inserted from the interior of the arm joint 11 into the interior of the wrist joint 13 and connected to the motor. In order to prevent the cables from tangling as the wrist joint rotates, a rotary member 14 with a central hole 141 is disposed between the wrist joint 13 and the rotary member 14, so that the wire connected to the motor of the wrist joint can insert through the central hole 141 into the wrist joint. However, the rotary member 14 is disposed in the arm joint 11, which is likely to increase the length of the arm joint 11. Besides, the structural strength of the rotary member 14 is low, which results in a low torque capability and a restricted rotation angle of the wrist joint 13.

To solve the above problem, a hollow reduction gear is used to drive the wrist joint, so that cables can be inserted through the central hole of the hollow reduction gear into the wrist joint. However, the number of cables that can insert through the central hole is limited by the size of the central hole of the hollow reduction gear. Therefore, the cables for controlling the end of the arm have to be disposed outside the arm, as a result, the cables are likely to get tangled when the arm rotates.

To solve the problem of wire tangling, Japan Publication No. JP2006321026 discloses an industrial robot, wherein each of the motors is additionally provided with a matrix converter so as to reduce the number of cables inside the arm. An external 3-phase AC power source is connected in parallel to the power supply of the motors, so that the number of power cables inside the arm is reduced from 12 to 3, making it easier for the cables to pass through the central hole of the hollow reduction gear, and reducing the difficulty of wiring. However, the converters have to control voltage and current, which requires relatively complicated technology, thus making the system complicated.

The present invention has arisen to mitigate and/or obviate the afore-described disadvantages.

SUMMARY OF THE INVENTION

The primary objective of the present invention is to provide a wrist structure for an articulated robotic arm, which is capable reducing the number of cables inserted in the wiring hole of the wrist of the robotic arm, without restricting rotation angle and increasing the size of the wiring hole, thus improving installation and maintenance conveniences, and providing easy controllability of the wrist.

To achieve the above objective, a wrist structure for an articulated robotic arm in accordance with the present invention comprises: a wrist body, a rotary member, a signal processing circuit board, a connector, a control unit and a drive unit. The wrist body includes a front end portion, a rear end portion, a receiving portion between the front and rear end portions, and a wiring hole formed in the rear end portion to enable the receiving portion to be in communication with an exterior of the wrist body. The rotary member is rotatably connected to the front end portion of the wrist body in a controllable manner. The signal processing circuit board is removably disposed at the rear end portion of the wrist body and located inside the receiving portion, and includes a gap aligned with the wiring hole. The connector is disposed in the wrist body and signal connected to the signal processing circuit board. The control unit is disposed inside the receiving portion of the wrist body and signal connected to the signal processing circuit board. The drive unit is disposed in the receiving portion of the wrist body to control the rotary member to swing with respect to the wrist body.

Preferably, the signal processing circuit board further includes a serial signal transmission interface, the wiring hole allows for insertion of a composite cable into the receiving portion, and the composite cable includes a serial signal cable which is signal connected to the serial signal transmission interface and used to transmit serial signals.

Preferably, the signal processing circuit board further includes a first connector module, an input/output module, a second connector module, and a processing unit, the first connector module is signal connected between the serial signal transmission interface and the serial signal cable and serves to transmit the serial signals to the serial signal transmission interface and then to the processing unit, the processing unit decodes the serial signals, the second connector module is signal connected to the input/output module, and the second connector is further signal connected to the control unit by a signal cable, and signal connected to the connector by a connector-signal cable.

Preferably, the signal processing circuit board is removably connected to the rear end portion of the wrist body by a bearing plate and located inside the receiving portion, and the bearing plate includes a quick-release portion locked to the rear end portion of the wrist body, and a bearing portion which is connected to the quick-release portion, located inside the receiving portion and provided for mounting of the signal processing circuit board.

Preferably, the rotary member has a first pivoted portion pivoted to the front end portion of the wrist body and a second pivoted portion pivoted to the first pivoted portion, and the drive unit includes a first motor assembly which controls the first pivoted portion to swing with respect to the wrist body, and a second motor assembly which controls the second pivoted portion to rotate with respect to the first pivoted portion.

Preferably, the composite cable includes a motor power cable and a motor signal cable which are electrically connected to the first and second motor assemblies.

Preferably, the first motor assembly includes a first reduction gear and a first motor dynamically connected to the first reduction gear, and the second motor assembly includes a second reduction gear and a second motor dynamically connected to the second reduction gear.

Preferably, the rear end portion of the wrist body is pivoted to the arm body via a hollow reduction gear which is disposed at the rear end portion of the wrist body, and the hollow reduction gear includes a hole which is in communication with the wiring hole and provided for insertion of the composite cable.

DETAILED DESCRIPTION OF THE PREFERRED EMBODIMENTS

Figure 1:
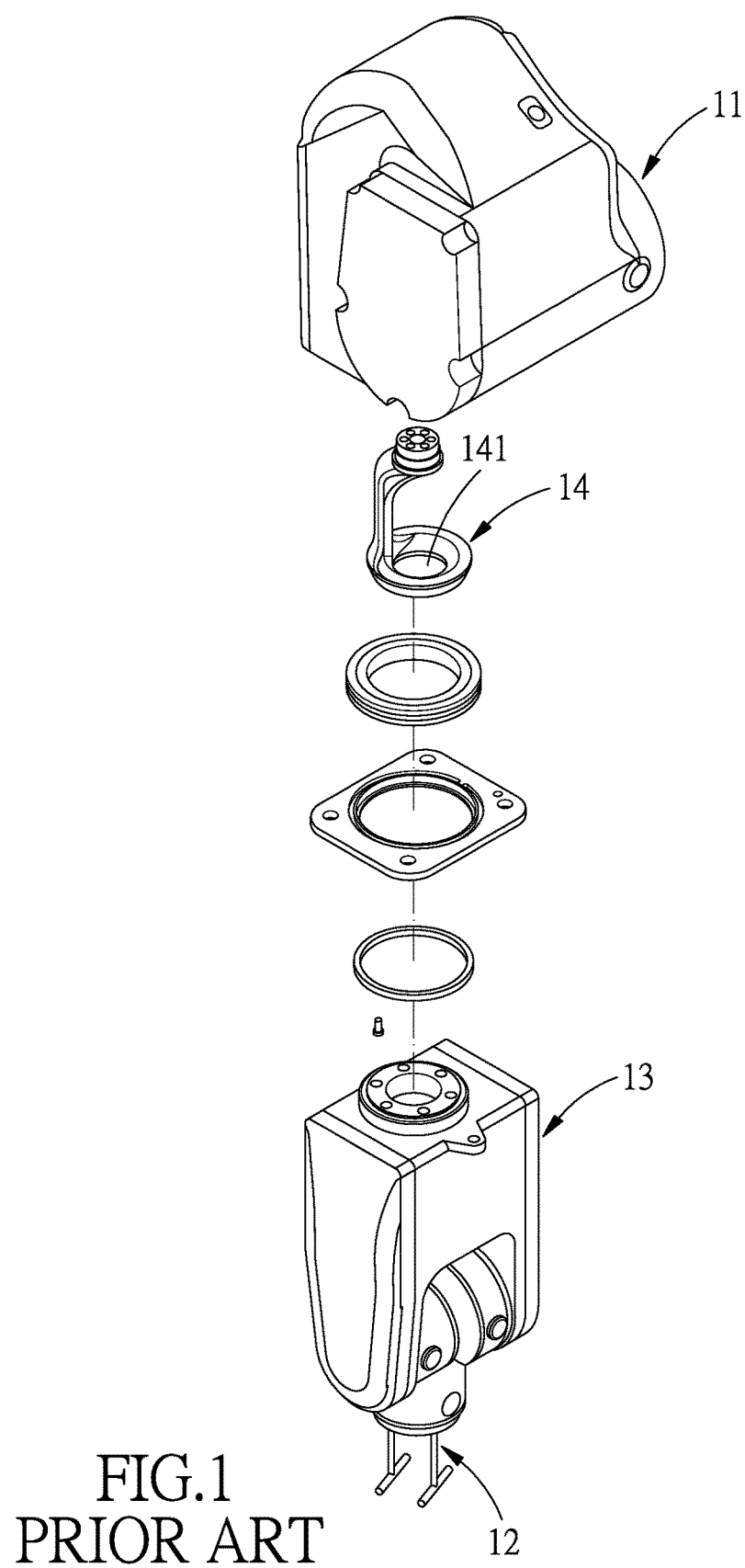
FIG. 1 is an exploded view of a robotic arm assembly disclosed in U.S. Publication No. 20110154938A1.

The present invention will be clearer from the following description when viewed together with the accompanying drawings, which show, for purpose of illustrations only, the preferred embodiment in accordance with the present invention.

Referring to FIGS. 2-8, a wrist structure for an articulated robotic arm in accordance with a preferred embodiment of the present invention is suitable for use in an arm body 21 of the articulated robotic arm and provided with an end effector 22. The wrist structure comprises a wrist body 30, a rotary member 40, a signal processing circuit board 50, a connector 60, a control unit 70 and a drive unit 80.

The wrist body 30 includes a front end portion 31, a rear end portion 32, a receiving portion 33 between the front and rear end portions 31, 32, and a wiring hole 34 formed in the rear end portion 32 to enable the receiving portion 33 to be in communication with the exterior of the wrist body 30. In this embodiment, the rear end portion 32 is pivoted to the arm body 21, and the wiring hole 34 allows for insertion of a composite cable 91 into the receiving portion 33. The composite cable 91 includes a serial signal cable 911, a motor power cable 912 and a motor signal cable 913.

The rotary member 40 is rotatably connected to the front end portion 31 of the wrist body 30 in a controllable manner. In this embodiment, the rotary member 40 has a first pivoted portion 41 pivoted to the front end portion 31 of the wrist body 30 and a second pivoted portion 42 pivoted to the first pivoted portion 41, and the second pivoted portion 42 is equipped with an end effector 22.

The signal processing circuit board 50 is removably disposed at the rear end portion 32 of the wrist body 30 and located inside the receiving portion 33, and includes a gap 51 aligned with the wiring hole 34. In this embodiment, the signal processing circuit board 50 is removably connected to the rear end portion 32 of the wrist body 30 by a bearing plate 96 and located inside the receiving portion 33. The bearing plate 96 includes a quick-release portion 961 locked to the rear end portion 32 of the wrist body 30, and a bearing portion 962 which is connected to the quick-release portion 961, located inside the receiving portion 33 and provided for mounting of the signal processing circuit board 50. The bearing plate 96 also includes a bearing-plate gap 963 aligned with the wiring hole 34 and is fastened to the signal processing circuit board 50 by a plurality of bolts 52. The signal processing circuit board 50 further includes a serial signal transmission interface 53, a first connector module 54 signal-connected to the serial signal transmission interface 53, an input/output module 55, a second connector module 56 signal-connected to the input/output module 55, and a processing unit 57. The serial signal cable 911 of the composite cable 91 is signal-connected to the first connector module 54 and therefore indirectly signal-connected to the serial signal transmission interface 53 to transmit serial signal.

Figure 2:
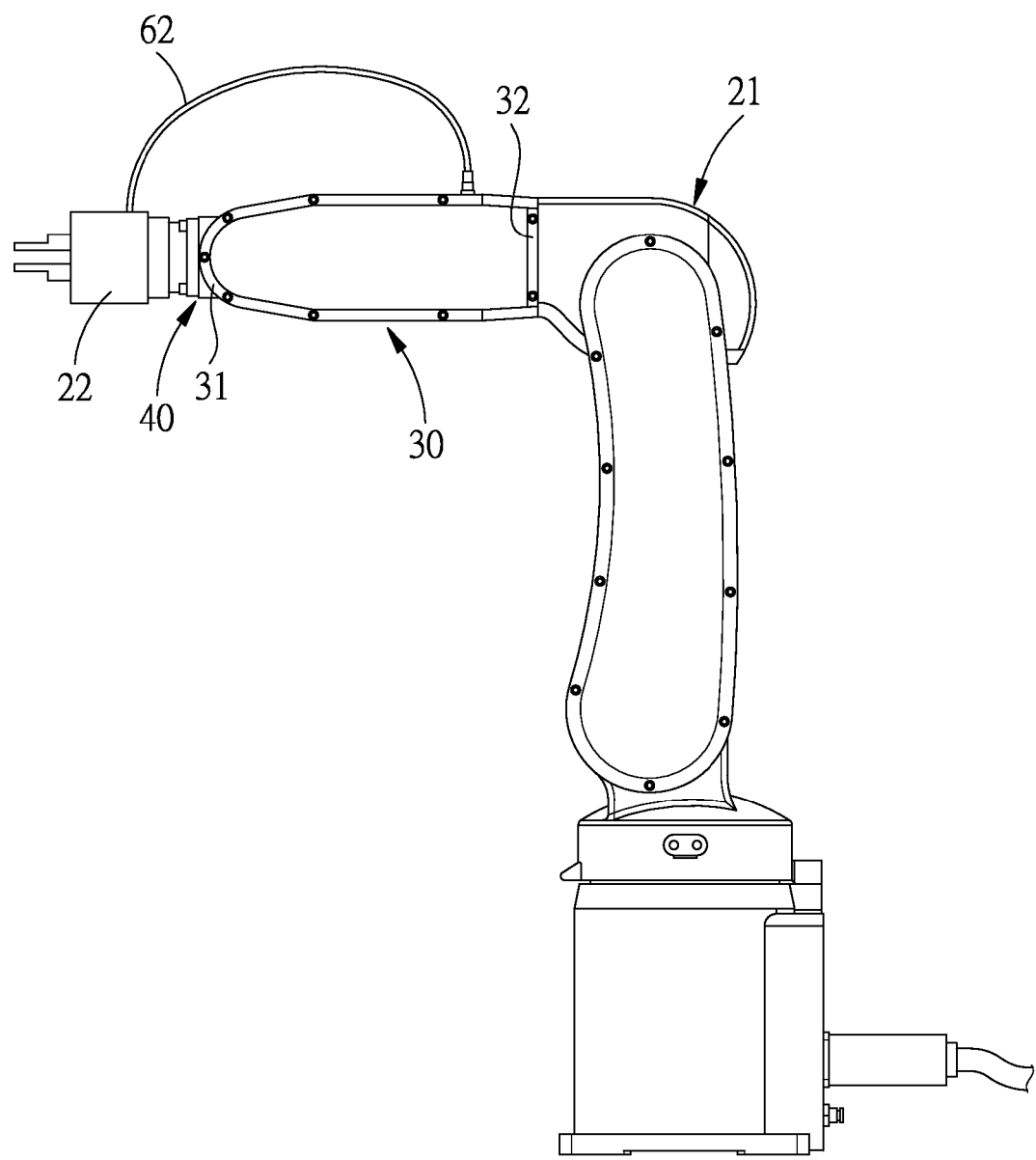
FIG. 2 is a side view of a wrist structure for an articulated robotic arm in accordance with a preferred embodiment of the present invention.
Figure 3:
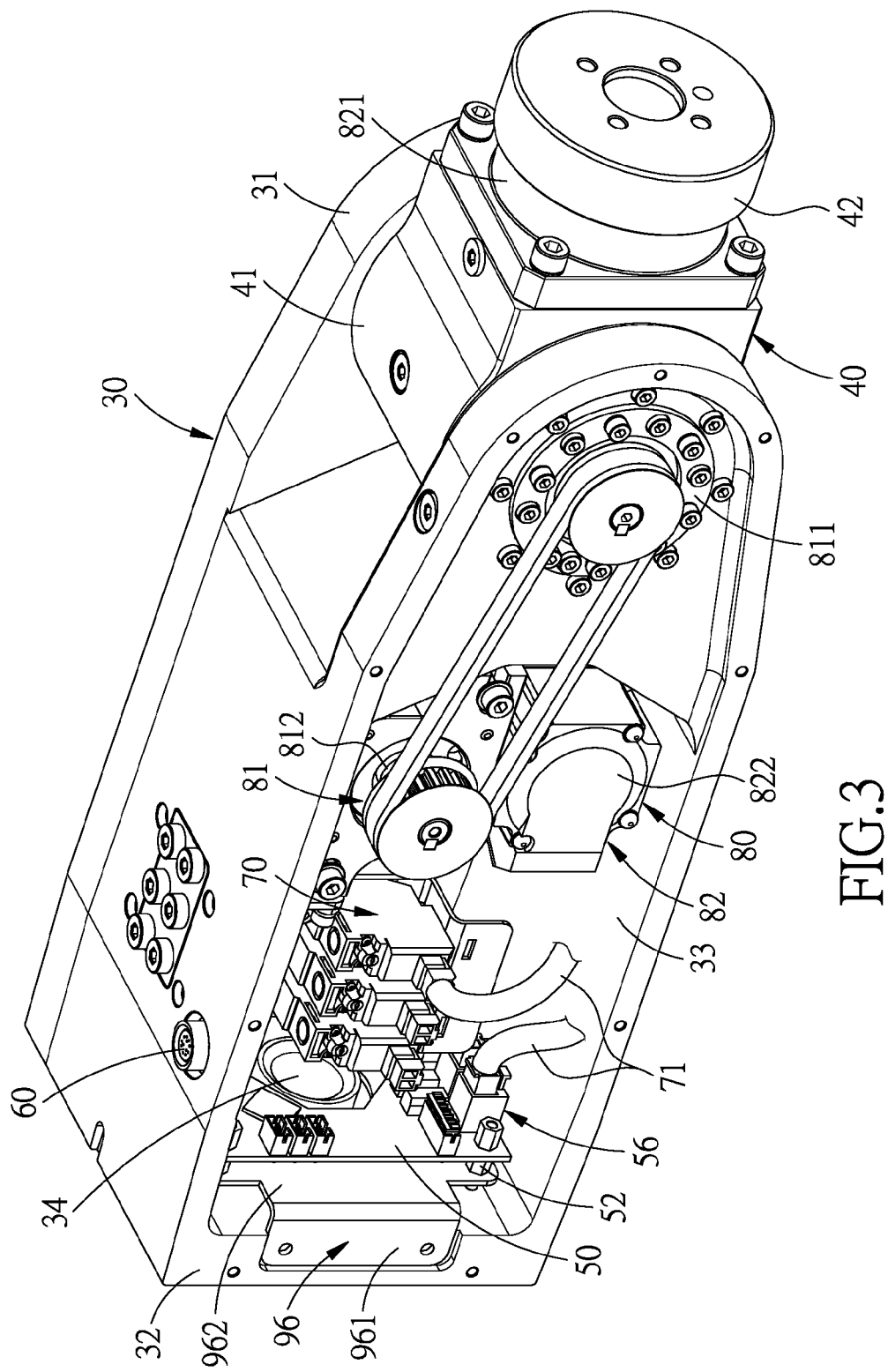
FIG. 3 is an assembly view of the wrist structure for an articulated robotic arm in accordance with the present invention.
Figure 4:
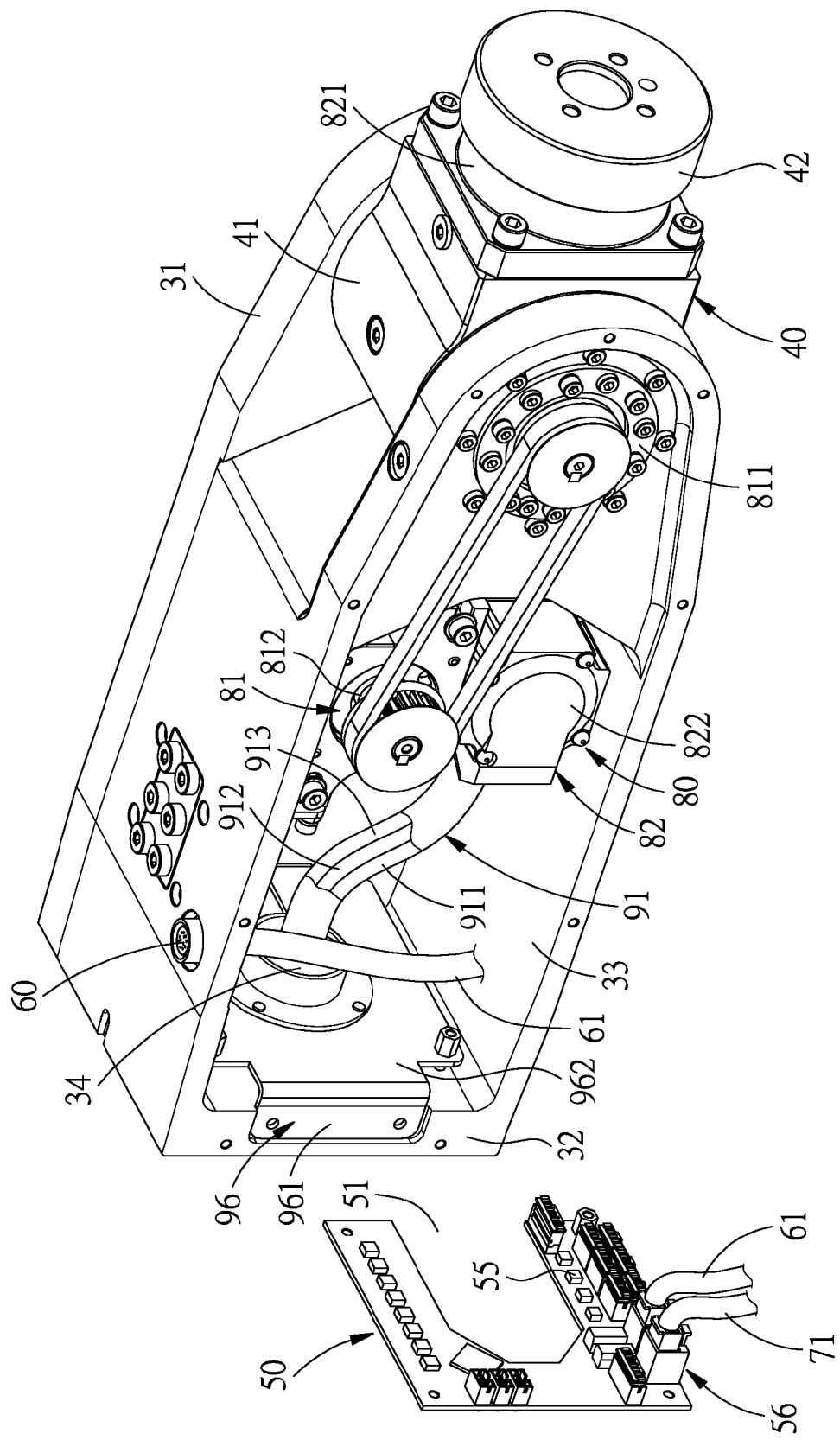
FIG. 4 is an exploded view of the wrist structure for an articulated robotic arm in accordance with the present invention, showing that the signal processing circuit board is removed from the wrist body.
Figure 5:
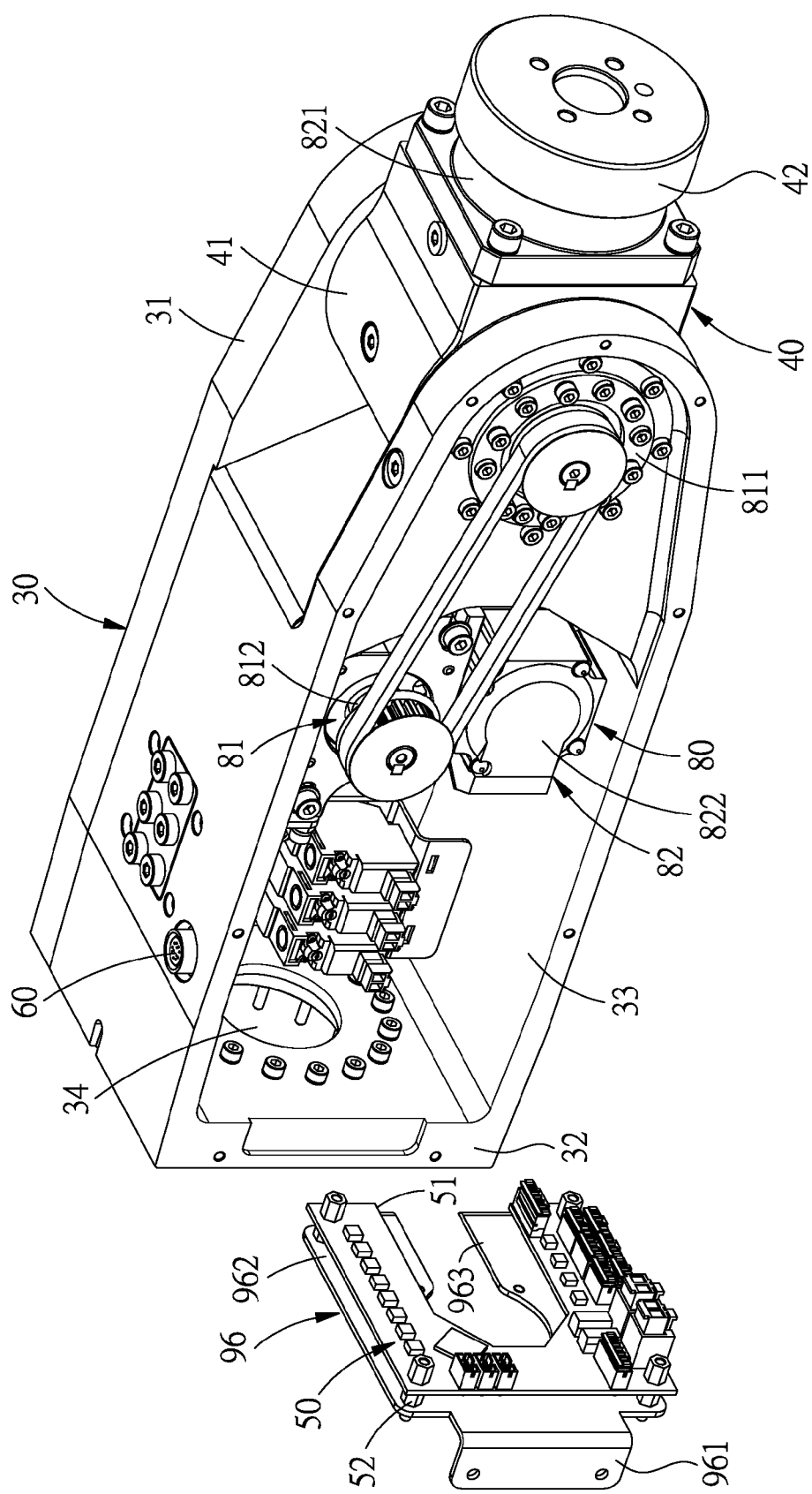
FIG. 5 is an exploded view of the wrist structure for an articulated robotic arm in accordance with the present invention, showing that the signal processing circuit board and the bearing plate are removed from the wrist body.
Figure 6:
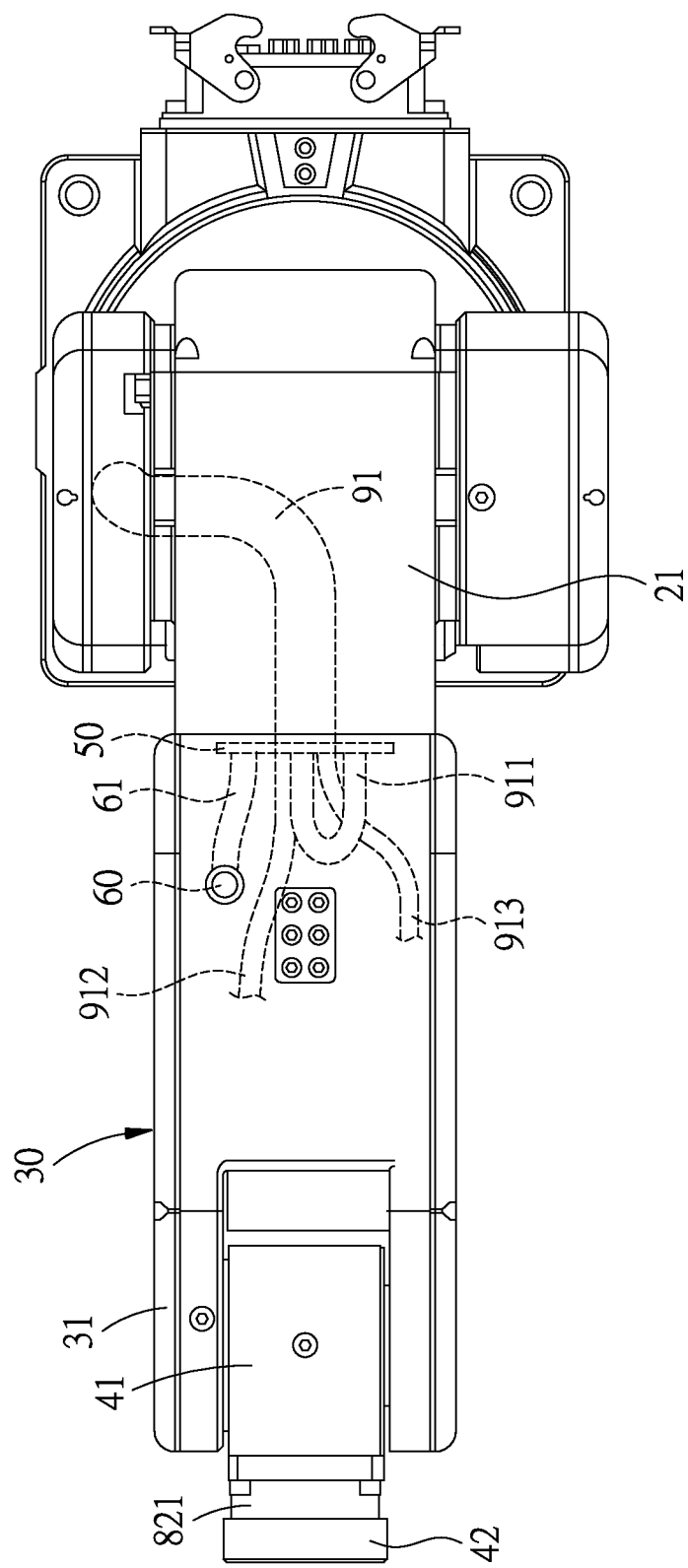
FIG. 6 is a top view of the wrist structure for an articulated robotic arm in accordance with the present invention.
Figure 7:
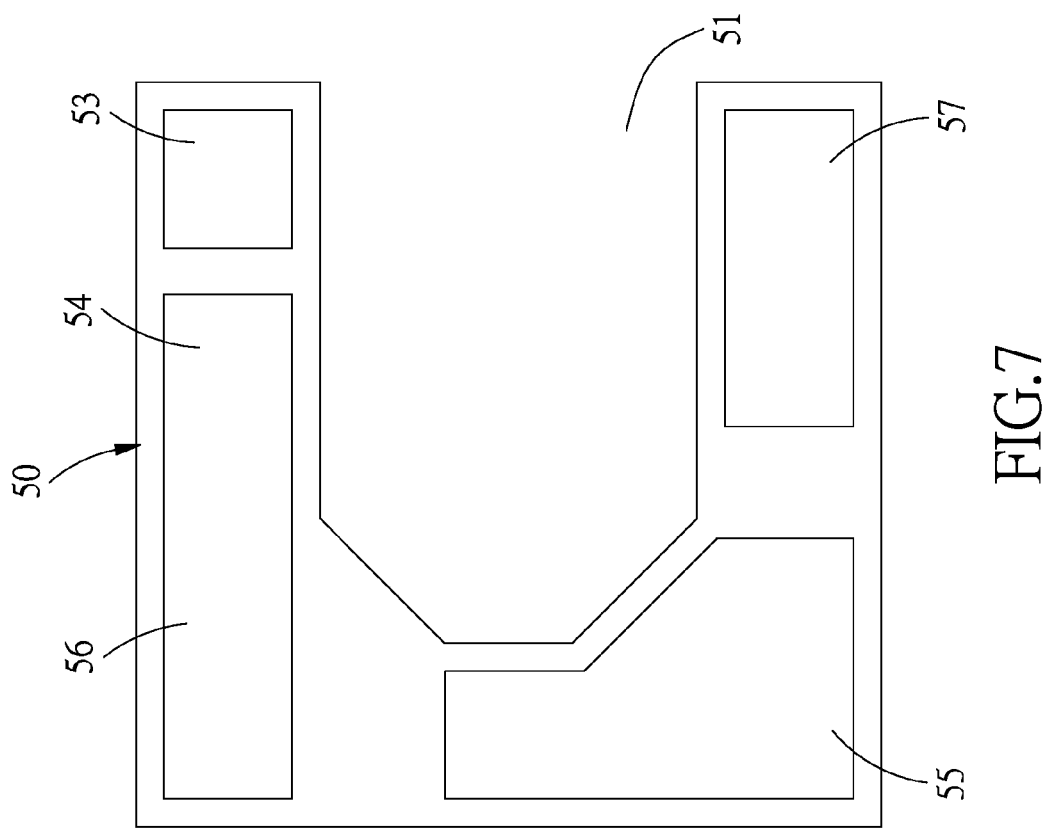
FIG. 7 is a side view of the signal processing circuit board of the wrist structure for an articulated robotic arm in accordance with the present invention.

The connector 60 is disposed in the wrist body 30 and signal connected to the signal processing circuit board 50. In this embodiment, the connector 60 is connected to the input/output module 55 and also signal connected to the second connector module 56 by a connector-signal cable 61, so that the connector 60 is signal connected to the input/output module 55. Between the connector 60 and the end effector 22 is connected a signal/power cable 62 (as shown in FIG. 2) to perform power and signal transmission.

The control unit 70 is disposed inside the receiving portion 33 of the wrist body 30 and signal connected to the signal processing circuit board 50. In this embodiment, the control unit 70 is a solenoid valve control unit signal connected to the second connector module 56 by a solenoid-valve signal cable 71, so that the control unit 70 is signal connected to the input/output module 55 of the signal processing circuit board 50.

The drive unit 80 is disposed in the receiving portion 33 of the wrist body 30 and controls the rotary member 40 to swing with respect to the wrist body 30. In this embodiment, the drive unit 80 includes a first motor assembly 81 for controlling the first pivoted portion 41 to swing with respect to the wrist body 30, and a second motor assembly 82 for controlling the second pivoted portion 42 to rotate with respect to the first pivoted portion 41, and is controlled by a controller 23 disposed at the bottom of the robotic arm. Signal control and power supply of the first and second motor assemblies 81, 82 come from the motor power cable 912 and the motor signal cable 913. The first motor assembly 81 includes a first reduction gear 811 and a first motor 812 dynamically connected to the first reduction gear 811. The second motor assembly 82 includes a second reduction gear 821 and a second motor 822 dynamically connected to the second reduction gear 821.

What mentioned are the structure relations of the main components of the preferred embodiment of the present invention, and for a better understanding of the wrist structure, reference should be made to the following description matter.

Figure 8:
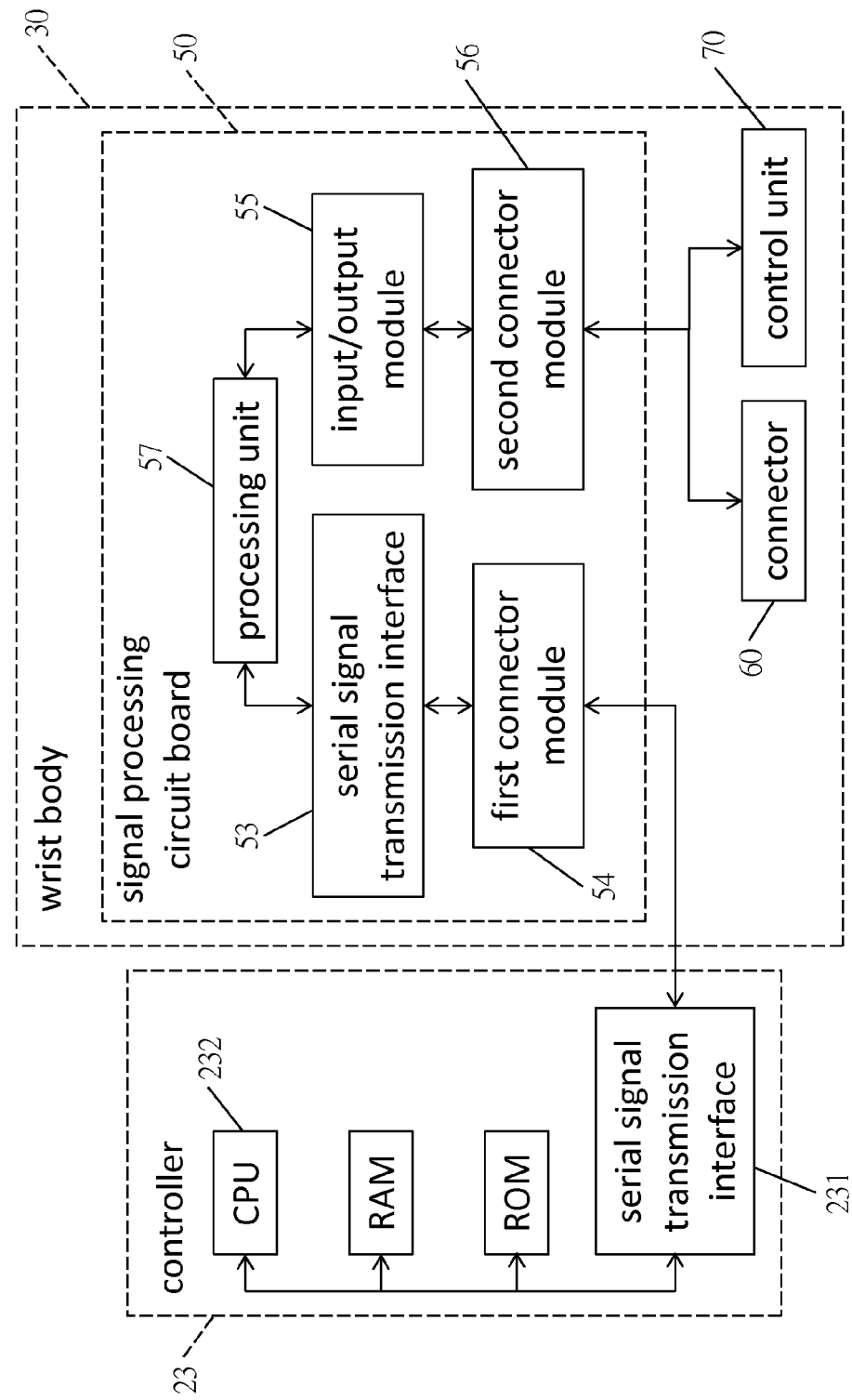
FIG. 8 is a block diagram of the wrist structure for an articulated robotic arm in accordance with the present invention.

In the receiving portion 33 of the wrist body 30 is disposed the signal processing circuit board 50. The signal processing circuit board 50 is signal connected to one end of the serial signal cable 911 of the composite cable 91 by the first connector module 54, and another end of the serial signal cable 911 is connected to the controller 23 (as shown in FIG. 8) which is disposed at the bottom of the robotic arm. By such arrangements, the serial signals transmitted from the controller 23 of the robotic arm can be decoded into parallel signals, and the parallel signals are used as output signals to control the control unit 70 or the end effector 22. Similarly, the signal processing circuit board 50 will receive inputted parallel signals, covert them into serial signals, and send the serial signals to the controller 23 of the robotic arm. Hence, the present invention is capable reducing the number of cables inserted in the wiring hole 34 of the wrist of the robotic arm, without restricting rotation angle and increasing the size of the wiring hole 34, thus improving installation and maintenance conveniences, and providing easy controllability of the wrist.

It is to be noted that the signal processing circuit board 50 is formed with the gap 51 aligned with the wiring hole 34. When the composite cable 91 is inserted in the wiring hole 34 and wiring is done, the gap 51 can prevent the interference of the signal processing circuit board 50 with the composite cable 91 when the signal processing circuit board 50 is being disassembled, namely, making it easy to remove the signal processing circuit board 50.

Besides, the signal processing circuit board 50 is removably connected to the rear end portion 32 of the wrist body 30 by the bearing plate 96 and located inside the receiving portion 33. The signal processing circuit board 50 can be easily removed simply by detaching the quick-release portion 961 of the bearing plate 96 from the wrist body 30, thus facilitating the replacement and maintenance of the signal processing circuit board 50.

Referring finally to FIG. 8, the operation and configuration of the wrist of the robotic arm of the present invention are described as follows.

The signal processing circuit board 50 includes the serial signal transmission interface 53, the first connector module 54 signal-connected to the serial signal transmission interface 53, the input/output module 55, the second connector module 56 signal-connected to the input/output module 55, and the processing unit 57.

The processing unit 57 is a microcontroller responsible for coding and decoding of serial signal, controlling of output signals, and reading of input signals.

The serial signal transmission interface 53 includes an electronic signal switching element (photorelay and optocoupler), the photorelay provides the functions of output and insulation, and the optocoupler provides the functions of input and insulation.

The first connector module 54 is a connector of the serial signal transmission interface 53.

The second connector module 56 is a connector of the input/output module 55 and used to connect the signal of the input/output module 55 to the connector 60 of the wrist body 30 and the control unit 70.

The procedure of the generation of output signals of the signal controlling is described as follows:

The output signals to be controlled are converted into serial signals by the serial signal transmission interface 231 of the controller 23, and then sent to the signal processing circuit board 50 inside the wrist body 30. Then, the first connector module 54 transmits the serial signals to the serial signal transmission interface 53 and then to the processing unit 57. The processing unit 57 then decodes the serial signals and sent the decoded output signal instruction to the input/output module 55. Then, the photorelay of the input/output module 55 generates insulated output signals, and the output signals are sent by the second connector module 56 to the connector 60 and the control unit 70 of the wrist body 30 to perform controlling tasks.

The procedure of receiving input signals in accordance with the signal controlling method is described as follows:

Input signals are inputted in the connector 60 of the wrist body 30 and transmitted via the second connector module 56 of the signal processing circuit board 50 to the input/output module 55. Then, the photorelay of the input/output module 55 generates insulated output signals, and the output signals are sent to the processing unit 57. The processing unit 57, then reads and decodes the input signals. Then, the decoded input signals are transmitted through the serial signal transmission interface 53 and the first connector module 54 of the signal processing circuit board 50 to the controller 23. Then, the serial signal transmission interface 231 of the controller 23 receives and sends the decoded input signals to a central process unit (CPU) 232, where the CPU 232 decodes and reads the input signals.

Figure 9:
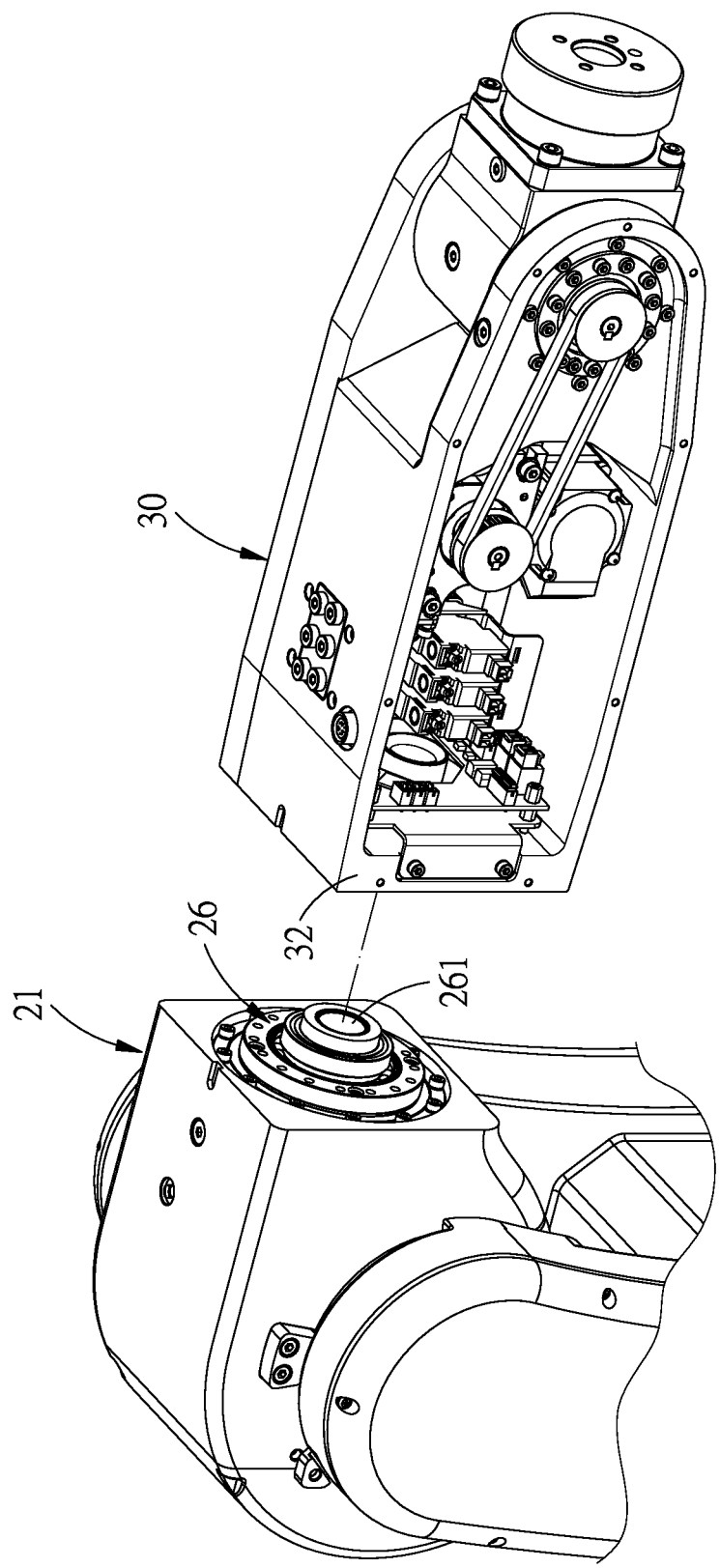
FIG. 9 is an illustrative view of the wrist structure for an articulated robotic arm in accordance with the present invention.

It is to be noted that, as shown in FIG. 9, the rear end portion 32 of the wrist body 30 is pivoted to the arm body 21 via a hollow reduction gear 26 which is disposed at the rear end portion 32 of the wrist body 30, and the hollow reduction gear 26 includes a hole 261 which is in communication with the wiring hole 34 and provided for insertion of the composite cable 91.

While we have shown and described various embodiments in accordance with the present invention, it is clear to those skilled in the art that further embodiments may be made without departing from the scope of the present invention.

What is claimed is:

1. A wrist structure for an articulated robotic arm comprising:
   a wrist body with a front end portion, a rear end portion, a receiving portion between the front and rear end portions, and a wiring hole formed in the rear end portion to enable the receiving portion to be in communication with an exterior of the wrist body;
   a rotary member rotatably connected to the front end portion of the wrist body in a controllable manner;
   a signal processing circuit board being removably disposed at the rear end portion of the wrist body and located inside the receiving portion, and including a gap aligned with the wiring hole;
   a connector disposed in the wrist body and signal connected to the signal processing circuit board;
   a control unit disposed inside the receiving portion of the wrist body and signal connected to the signal processing circuit board; and
   a drive unit disposed in the receiving portion of the wrist body to control the rotary member to swing with respect to the wrist body.

2. The wrist structure for an articulated robotic arm as claimed in claim 1, wherein the signal processing circuit board further includes a serial signal transmission interface, the wiring hole allows for insertion of a composite cable into the receiving portion, and the composite cable includes a serial signal cable which is signal connected to the serial signal transmission interface and used to transmit serial signals.

3. The wrist structure for an articulated robotic arm as claimed in claim 2, wherein the signal processing circuit board further includes a first connector module, an input/output module, a second connector module, and a processing unit, the first connector module is signal connected between the serial signal transmission interface and the serial signal cable and serves to transmit the serial signals to the serial signal transmission interface and then to the processing unit, the processing unit decodes the serial signals, the second connector module is signal connected to the input/output module, and the second connector is further signal connected to the control unit by a signal cable, and signal connected to the connector by a connector-signal cable.

4. The wrist structure for an articulated robotic arm as claimed in claim 1, wherein the signal processing circuit board is removably connected to the rear end portion of the wrist body by a bearing plate and located inside the receiving portion, and the bearing plate includes a quick-release portion locked to the rear end portion of the wrist body, and a bearing portion which is connected to the quick-release portion, located inside the receiving portion and provided for mounting of the signal processing circuit board.

5. The wrist structure for an articulated robotic arm as claimed in claim 1, wherein the rotary member has a first pivoted portion pivoted to the front end portion of the wrist body and a second pivoted portion pivoted to the first pivoted portion, and the drive unit includes a first motor assembly which controls the first pivoted portion to swing with respect to the wrist body, and a second motor assembly which controls the second pivoted portion to rotate with respect to the first pivoted portion.

6. The wrist structure for an articulated robotic arm as claimed in claim 5, wherein the composite cable includes a motor power cable and a motor signal cable which are electrically connected to the first and second motor assemblies.

7. The wrist structure for an articulated robotic arm as claimed in claim 5, wherein the first motor assembly includes a first reduction gear and a first motor dynamically connected to the first reduction gear, and the second motor assembly includes a second reduction gear and a second motor dynamically connected to the second reduction gear.

8. The wrist structure for an articulated robotic arm as claimed in claim 1, wherein the rear end portion of the wrist body is pivoted to the arm body via a hollow reduction gear which is disposed at the rear end portion of the wrist body, and the hollow reduction gear includes a hole which is in communication with the wiring hole and provided for insertion of the composite cable.

* * * * *